United States Patent [19]

Goudy, Jr. et al.

[11] Patent Number: 4,662,538
[45] Date of Patent: May 5, 1987

[54] BACTERICIDAL PELLET DISPENSER

[75] Inventors: Paul R. Goudy, Jr., Milwaukee; Keith A. Lamon, St. Francis; William G. Weekley, Milwaukee, all of Wis.

[73] Assignee: Autotrol Corporation, Milwaukee, Wis.

[21] Appl. No.: 656,176

[22] Filed: Sep. 28, 1984

[51] Int. Cl.⁴ .............................................. B65G 59/06
[52] U.S. Cl. ...................................... 221/265; 221/15; 221/203; 222/370; 422/266
[58] Field of Search ................ 221/9, 13, 15, 21, 258, 221/263, 265, 243, 264, 202, 203; 222/290, 292, 328, 370, 367, 516, 336; 133/8 R; 206/540; 422/263, 264, 266, 269, 271, 273; 210/198.1

[56] References Cited

U.S. PATENT DOCUMENTS

| | | | |
|---|---|---|---|
| 736,257 | 8/1903 | Heylman | 222/370 X |
| 1,523,118 | 1/1925 | Green | |
| 1,562,152 | 11/1925 | Du Grenier | 221/263 |
| 2,649,994 | 8/1953 | Lewis et al. | 221/265 |
| 3,022,247 | 2/1962 | Selby et al. | 210/59 |
| 3,232,621 | 2/1966 | Michelson | 221/263 X |
| 3,253,738 | 5/1966 | Bromley | 221/200 |
| 3,706,396 | 12/1972 | Knapp et al. | 221/265 |
| 3,785,525 | 1/1974 | Handeland | 221/265 |
| 4,150,766 | 4/1979 | Westendorf et al. | 221/265 X |
| 4,216,788 | 8/1980 | Watanabe et al. | 133/8 R |
| 4,235,849 | 11/1980 | Handeland | 422/263 |

FOREIGN PATENT DOCUMENTS 795644 10/1968 Canada .............................. 206/540
1086632 2/1955 France .

Primary Examiner—F. J. Bartuska
Assistant Examiner—Edward S. Ammeen
Attorney, Agent, or Firm—Quarles & Brady

[57] ABSTRACT

A dispensing device for a bactericidal pellet such as chlorine tablets which is readily adapted to being placed on a hopper container for the pellets and which can dispense the pellets such as in conjunction with a well or a water recirculation system while employing a minimum number of parts. The pellet dispenser employs a unique rotor member with pellet carrying passages designed to dispense the pellets from the hopper and out of the pellet dispenser in an individual manner and without jamming. In the instance where pellets may become improperly placed in the pellet carrying passages so that the rotor does not properly move inside the rotor housing, a bi-directional self-reversing motor is utilized so that the tablet dispensing sequence will continue in an accurate manner. This is effected in part by a bidirectional rotor member which is able to dispense tablets in a clockwise or counterclockwise manner.

7 Claims, 12 Drawing Figures

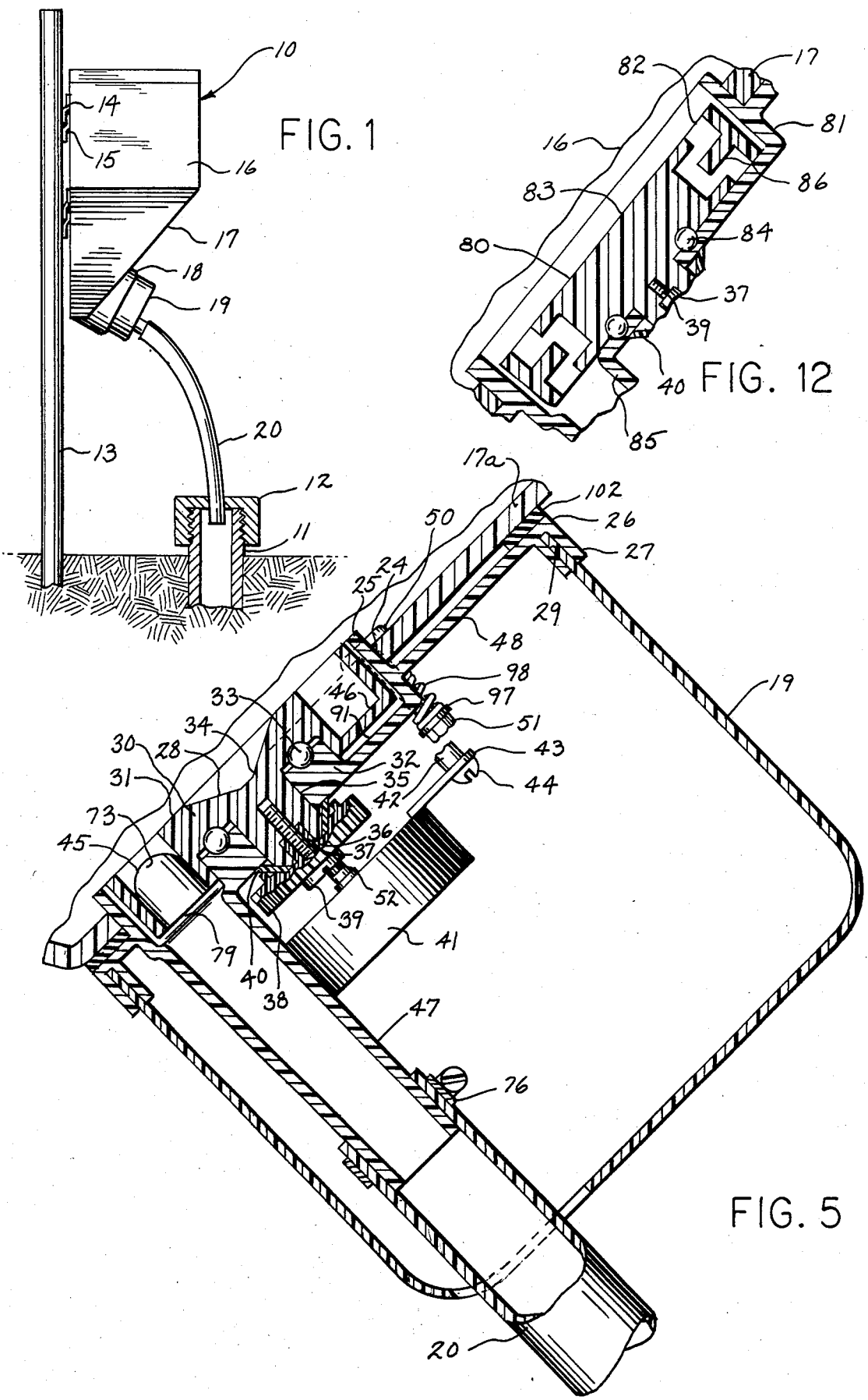

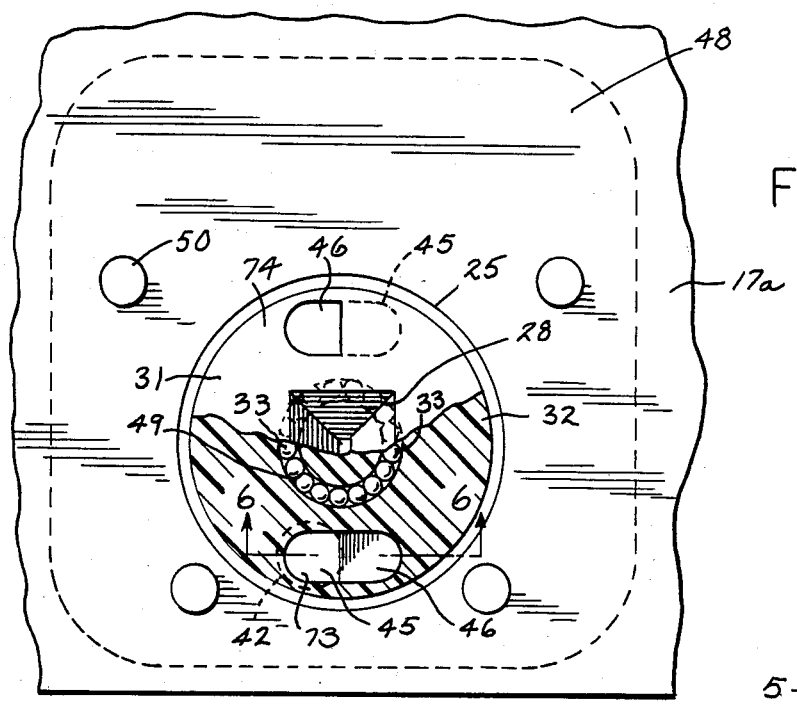
FIG. 3
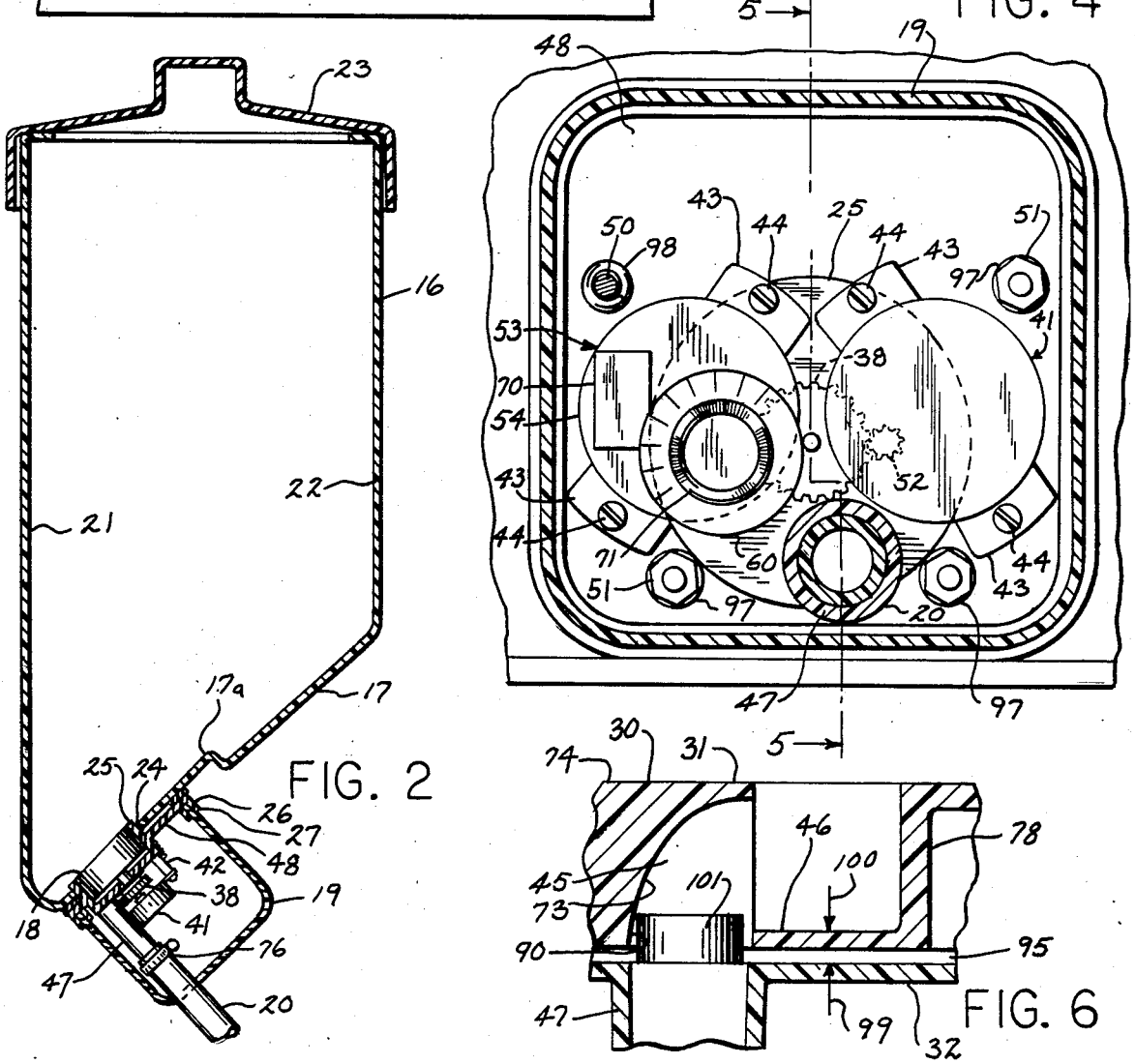
FIG. 4
FIG. 2
FIG. 6

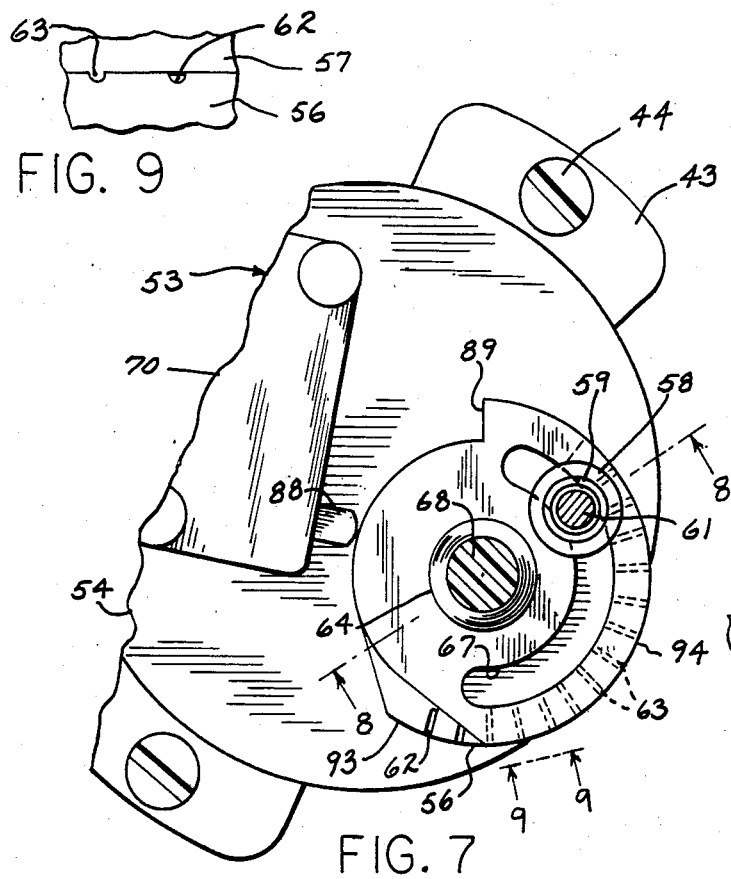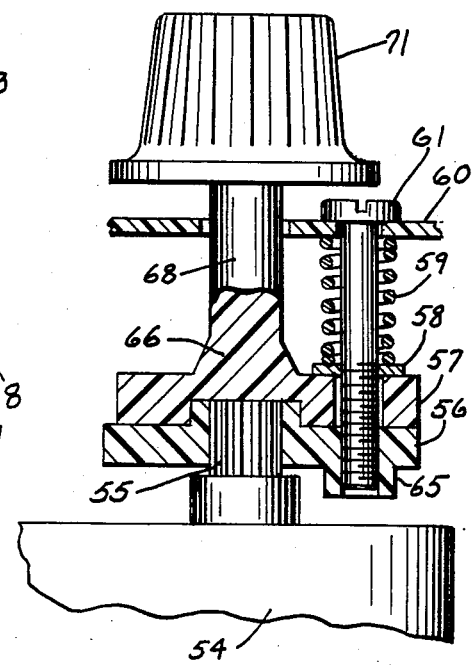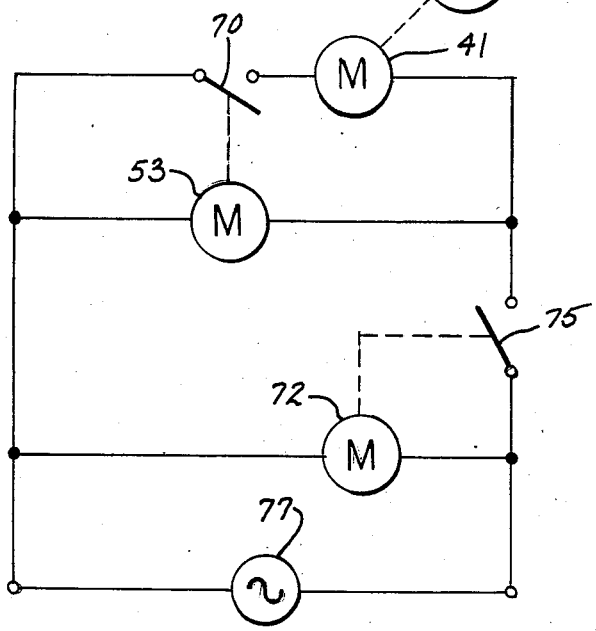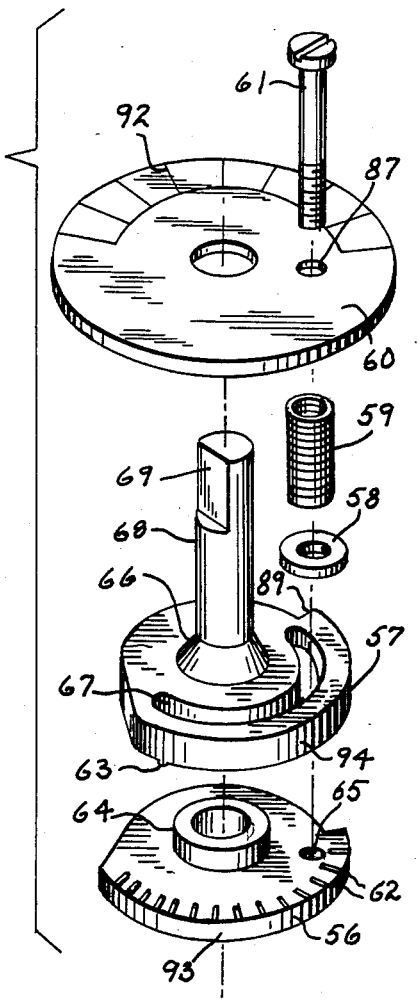

BACTERICIDAL PELLET DISPENSER

BACKGROUND OF THE INVENTION

This invention relates to a pellet handling device which can dispense pellets from a bulk supply source in an accurate manner. More particularly, it relates to a bactericidal tablet dispensing apparatus which employs a unique rotor mechanism so that it can accurately dispense a tablet from a mass of tablets in a hopper and into the water system while utilizing a minimum number of component parts. This invention further relates to an improved method of dispensing a bactericidal pellet.

A chemical tablet dispensing device for wells is described in U.S. Pat. Nos. 3,785,525 and 4,235,849. In U.S. Pat. No. 3,785,525, a base plate is positioned at the bottom of a container and has an aperture for receiving tablets. The tablets are presented to it by means of a rotating metering plate also having a port or cell therein to receive the tablets. Various baffling type structures are employed for purposes of presenting the tablets to the metering plate. The positioning of a metering plate transversely over the bottom of a container for a mass of tablets is commonplace and is also illustrated in U.S. Pat. No. 3,253,738 as well as French Pat. No. 1.086.632. In U.S. Pat. No. 3,022,247, a water treatment device is utilized wherein water is circulated to a receptacle having a bactericidal material therein and in U.S. Pat. No. 1,523,118 pulverulant material is introduced into a water treating system from a hopper with the material being discharged on a discharge plate. In those instances where the prior art describes the tablet dispensing type devices, they are either susceptible to jamming as in the instance of the dispensing device in U.S. Pat. No. 3,785,525 where a slip clutch mechanism is employed. This jamming of tablets occurs in tablet dispensing devices where a metering type plate with an orifice extends in a straight passage through the plate and in conjunction with a base plate having a similar orifice. In U.S. Pat. No. 4,235,849 a metering plate or disc is disposed at an incline with respect to the bottom wall of a housing for the tablets. However, this particular metering plate as is true of many prior art metering plates including that disclosed in U.S. Pat. No. 3,785,525 utilizes openings in the metering plates to effect a sliding action of the tablets over a base plate or bottom wall until the tablet carrying opening is orientated with an opening in the base plate. This type of structure lends itself to tablets becoming jammed in the openings as well as in the housing for the metering plates. In order to compensate for the jamming problems, various types of mechanisms such as the slip clutch or the baffle structures in U.S. Pat. Nos. 3,785,525 and 4,235,849 have been developed.

It is an advantage of the present invention to provide a pellet dispensing apparatus which can accurately and dependably dispense pellets from a bulk source. It is another advantage of this invention to provide a bactericidal pellet dispensing mechanism which is readily adapted to being placed on a hopper for the pellets. Still another advantage of this invention is a pellet dispensing apparatus employing a rotor which has unique pellet carrying passages therein so that the rotor will accept a single pellet in each discharge passage and in the event that a pellet is lodged in the rotor housing, the rotor can be reversed and yet accurately dispense the pellets therefrom in a self-reversing manner. Other advantages of this invention are an improved timing control mechanism for use with a pellet dispensing mechanism; a pellet dispensing mechanism employing a minimum number of component parts; can be employed with a low torque, bidirectional self-reversing motor so that the pellet dispensing apparatus can clear itself in the event of pellet jamming as well as of any particulate debris; and can be employed with various types of timing mechanisms and in conjunction with a wide variety of applications.

SUMMARY OF THE INVENTION

The foregoing advantages are accomplished and the shortcomings of the prior art are overcome by the present dispensing device for pellets as well as a method of dispensing wherein a hopper member has a wall portion with an opening therethrough. A pellet discharge passage means in the form of a discharge tube is connected to a rotor assembly which includes a housing member which is operatively positioned with respect to the hopper wall opening with the discharge tube in communication with the rotor assembly and providing a passage from the housing member. A rotor member is operatively mounted in the housing member and has at least one pellet carrying passage with the pellet carrying passage in communication with the hopper wall opening in one position and constructed to impart at least two different directions to the pellets as they pass therethrough. Drive means are operatively associated with the rotor member to rotate the rotor member in the housing. The rotor member has an open face portion for communication with the hopper wall opening and the rotor member is positioned in the housing at an angle in the range of greater than 0° and less than 90° with respect to the gravitational flow of tablets in the hopper. In the preferred embodiment, the pellet carrying passage is defined by a plurality of passages and in one embodiment the pellet carrying passage has a first passage portion at a first level and a second passage portion at a second level with the passages being interconnected by curved wall means. In another embodiment, the tablet carrying passage is formed by a channel which is substantially U-shaped in configuration with an intermediate baffle. The pellet carrying passages in the rotor member are designed to receive and accurately dispense tablets irrespective of whether the rotor member is rotated in a clockwise or counterclockwise manner. Also preferably, the drive means to rotate the rotor member includes a low torque, bidirectional self-reversing motor and the rotor member is fastened to the hopper by a biased attachment to assist in clearance of pellets which may become lodged in the rotor assembly. An inproved timer control for the self-reversing motor includes a biased cam member which in conjunction with a second cam member and frictional engagement means between the cam members can control the timing of the motor. The dispensing device herein disclosed is adapted to dispensing bactericidal pellets in a unique manner wherein the pellets are of a different composition and the pellets of one composition are dispensed in one instance and the pellets of another composition are dispensed at another with the pellets dispensed at a uniform rate.

BRIEF DESCRIPTION OF THE DRAWINGS

A better understanding of the present tablet dispensing device will be accomplished by reference to the drawings wherein:

FIG. 1 is a view in side elevation illustrating the pellet dispenser of this invention in conjunction with a well casing.

FIG. 2 is an enlarged view in vertical cross section illustrating the pellet dispenser indicated in FIG. 1 mounted on a pellet dispenser hopper.

FIG. 3 is a view from inside the pellet dispenser hopper illustrating the rotor mechanism of the pellet dispenser.

FIG. 4 is a view in horizontal section showing the timing and power mechanism for the pellet dispenser as mounted on a mounting plate.

FIG. 5 is an enlarged view in section taken along line 5—5 of FIG. 4.

FIG. 6 is a view in vertical section taken along line 6—6 of FIG. 3.

FIG. 7 is an enlarged, partial, top plan view of the timer mechanism illustrated in one embodiment of the invention.

FIG. 8 is a view in vertical section taken along line 8—8 of FIG. 7.

FIG. 9 is a partial view in vertical section taken along line 9—9 of FIG. 7.

FIG. 10 is an assembly view illustrating the camming portion of the timing mechanism shown in FIG. 8.

FIG. 11 is a diagrammatic view of the electrical circuitry utilized to energize the pellet dispenser of this invention.

FIG. 12 is a view of a second embodiment of the rotor mechanism taken in the same plane as FIG. 6.

DESCRIPTION OF THE EMBODIMENTS OF THE INVENTION

Proceeding to a detailed description of the embodiment of the present invention and particularly to FIG. 1 the pellet dispenser generally 10 is shown in conjunction with a well casing 11 having a cap 12 which will receive a tube 20 from the pellet dispenser 10. Pellet dispenser 10 is supported on a support pole 13 having the support flanges 15 which will receive the complementary flanges 14 from the pellet dispenser. A hopper 16 which will contain the pellets to be dispensed into the well casing 11 forms a portion of the tablet dispenser and will include an angled wall 17 from which extends a rotor assembly or pellet discharge means 18 a portion of which is protected by a cover 19.

Referring specifically to FIGS. 2 and 5, it will be seen that the rotor assembly 18 serves as a discharge means and is positioned on the hopper 16 and specifically on an inset portion 17a of the angled wall 17 having a passage 24 therethrough. The hopper 16 includes the opposing wall portions 21 and 22 as well as a cover 23 which can be secured, thereto by the usual latch members (not shown). An annular portion 25 of the rotor assembly 18 is interconnected with connecting portion 26 and extends through the annular passage 24 which is in communication with the inside of the hopper 16. The connecting portion 26 includes a base plate 48 and a dual flanged section 27 with a slot 29 to receive a portion of the cover 19 and retain it thereon. A rotor member 30 is rotatably mounted inside the annular portion 25 of the rotor assembly 18 and includes the bearing housing sections 31 and 32 with the bearings 33 therebetween. A shaft section 34 extends from the bearing housing 31 and into a passage 35 of the bearing housing 32 for rotatable movement therein. Rotative retention of the bearing or rotor housing 31 of the rotor member 30 against the bearing housing section 32 is accomplished in part by means of a square sectioned extended portion 37 seated in a compartment 36 in the shaft section 34 with the extended portion 37 being formed as portion of the drive gear 38. A screw 39 extends centrally through the drive gear 38 to hold a seal 40 between gear 38 and the outer wall surface of the bearing housing 32 to thereby also serve as a retention means for rotor housing 31 as well as a seal. The seal 40 is the subject of a patent application entitled "Seal Device for a Bactericidal Pellet Dispenser" filed simultaneously herein and commonly assigned. The teachings of that application are incorporated herein by reference.

The bolts such as 50 will connect the base plate 48 of the rotor assembly to the hopper wall 17a with the springs 98 effecting a biased connection. The nuts 51 and the washers 97 will provide suitable attachment of the springs 98. A gasket 102 will be placed and retained between the hopper wall 17a and the rotor assembly plate 48. A drive motor 41 is suitably mounted on a post 42 and has a mounting ear 43 for engagement with a screw 44. Extending through the rotor 30 and particularly housing 31 is a passage 45 which will include a floor section 46 the function of which will be later explained in conjunction with the description in FIG. 6. A tube portion 47 will communicate with the rotor passage 45 as well as with an additional passage portion 79 extending through the bearing or rotor housing section 32. The discharge tube 20 is connected to the tube portion 47 by a standard screw type hose clamp 76.

Referring to FIG. 3, the rotor member 30 is shown attached to the slanted wall portion 17a of the hopper 16 by means of a base plate 48 which will be connected thereto through the bolts such as 50 which will engage the screws 50 from the opposing side (see FIG. 4). It will be noted in conjunction with FIG. 3 that a bearing race 49 is formed in a bearing section 33 of bearing housing 32 and similarly it should be stated that as is indicated in FIG. 5 a similar race is formed in bearing housing 31.

FIG. 4 illustrates the timing and drive mechanism for rotating the rotor member 30 and consequently activating the pellet dispenser. As is shown, a pinion 52 extends from a motor 41 and will engage the drive gear 38. The motor 41 is controlled by a timer generally 53 which will include a housing 54 and a control knob 71 extending therefrom. The timer 53 is mounted to the base plate 48 in the same manner as is the motor 41 with the ears 43 extending therefrom and secured by the screws 44.

FIG. 6 shows the pellet passage 45 in the rotor member 30 with the arcuate passage 73 and the floor 46. It will be noted that floor 46 is spaced from the wall surface 95 of bearing housing 32 a distance represented by distance arrows 99 and 100. The importance of this distance will be later explained in the Operation. A suitable relief section 78 is provided in rotor member 30.

The details of the timer mechanism 53 are illustrated in FIGS. 7-9 where it will be seen that a rotor drive shaft 55 extends from the housing 54 and engages a first cam plate 56. A second independent cam plate 57 from which extends knob shaft 68 is in frictional contact with the cam plate 56. The cam plate 57 is biased against cam plate 56 by means of a spring 59 engaging washer 58, the spring 59 being retained between a dial plate 60 and the washer 58. A bolt 61 extends through the dial plate 60 as well as the cam plate 57 and will be threaded in a nut portion 65 of the cam plate 56.

As best seen in FIGS. 9 and 10, a groove 67 of an arcuate configuration extends through the cam plate 57 which also has a projection 63 extending therefrom which will selectively engage the notches 62 in the cam plate 56. An annulus 64 extends upwardly from cam plate 56 and will be accommodated under the conical section 66 of the cam plate 57. The knob shaft 68 has a flat section 69 to receive the knob 71 in the usual engaging manner and the dial plate 60 has an opening 87 to receive the bolt 61 therethrough. The basic features of the timer motor 53 and the cam plates 56 and 57 with the camming surfaces 93 and 94 as well as drop surface 89 are standard equipment supplied by the Singer Controls Division of the Original Controls Company in Schiller Park, Ill. The improvements to this timer motor are the addition of the biasing means afforded by the dial plate spring 59 and the addition of the projection 63 extending from the cam plate 57 to selectively engage the notches 62 in the cam plate 56 for reasons as will be later explained. As will be seen specifically in conjunction with FIG. 9, the cam plate 57 will interengage the cam plate 56 at various locational points as governed by the position at which the projection 63 will engage the notches 62 for purposes of extending or limiting the time of contact between cam surfaces 93 and 94 and the switch arm 88 of the timer switch 70 (see FIG. 7). This will be further explained in the following Operation.

Operation

A better understanding of the advantages of the pellet dispenser 10 and a method of its use will be had by the description of its operation. One method of utilizing the dispensing apparatus 10 is indicated in FIG. 1 where it will be supported on a support pole 13 and in conjunction with a well casing 11 for the purpose of dispensing bactericidal pellets in the form of tablets, such as chlorine tablets, into the well by way of the well casing 11. Accordingly, the hopper 16 will be filled to a desired level with the chlorine tablets. The tablets can be of the same chemical bactericidal composition such as chlorine or of a different bactericidal composition such as chlorine and a quatenary ammonium or sulfonated compound. If of a different composition they will be present in the hopper at the same time and intermixed in a heterogenous mass and manner such that they are dispensed by the pellet dispenser at a uniform rate on a statistical basis. If the tablets are of the same composition, the next batch of tablets placed in the hopper at a different time should be of a different composition so as to obtain maximum bactericidal benefit. A circuit diagram for operating the pellet dispenser is shown in FIG. 11 and reference is made thereto. It will be seen that the meter motor 41 for operating or rotating the rotor member 30 is interconnected to a standard pump motor 72. When the pump which is utilized in conjunction with a standard household well is actuated it will close a switch such as at 75 to complete a circuit to the timer mechanism 53. The actuation of the timer will in turn close the switch 70 so as to complete the circuit to the meter motor 41. As the pinion 52 from the meter motor rotates it will in turn rotate the drive gear 38 which in turn will cause the rotor 30 to rotate inside the annular portion 25 which is in communication with the inside of the hopper 16. A switch 77 is provided as an on and off control.

Referring to FIG. 3 it will be seen that two pellet passages 45 are disposed in the rotor member 30 and as they rotate in a counterclockwise direction as viewed in FIG. 3, tablets will enter the passageways 45 due to the force of gravity and the inclination of the rotor member 30. It will be appreciated that the bearing housing 31 provides a face plate surface 74 in contact with the tablets and through which the tablets enter the passages 45. As they enter the passages they will first engage a floor portion 46 where they will be retained for a short period of time and then are moved into the arcuate like passage portion 73. When the downward section 90 of the passage portion 73 is orientated with the passage 79, the tablets will flow into and through the tube portion 47, into the tube 20 and ultimately into the well through the casing 11.

There are several important aspects of this invention in providing a positive depositing of a pellet or tablet from hopper 16 and into the well casing is assured at any given time. First, the fact that the rotor member 30 is mounted in relation to the gravitational forces of the pellets in the hopper 16, at an angle greater than 0° and less than 90 degrees and preferably 30°-60°; Second, the fact that the rotor member 30 is provided with pellet carrying passages 45 which by means of floor 46 effect a change in direction to the pellet to provide in effect a switch type action for the pellet as it passes therethrough. These two features aid in positioning a single pellet in the pellet passage 45 as gravitational forces will not tend to force more than one pellet therein and as a supporting floor 46 is presented for the first pellet to enter, others are contacted by the already present pellet; Third, the fact that pellet passage 45 will accept a tablet 101 when the rotor member is rotating in a counterclockwise or clockwise manner. Clockwise feeding of the pellets is assisted by the fact that the tablet 101 will be retained between floor 46 and bearing housing 32 during clockwise rotation. This is afforded by having the distance between arrows 99 and 100 greater than one half of the height of the tablet 101 (See FIG. 6); Fourth, the feature of having the rotor assembly attached to the hopper in a biased manner through the springs 98. These unique combination of features permits the usage of a low torque motor such as the motor 41 to be utilized which in this instance is of the self-reversing type and is available from Singer Controls Division, designated as Schiller Park, Ill. If at any time a resistance of a given force is encountered by the rotor member 30, the motor will reverse the rotation of the rotor member 30 to thereby aid in clearing any tablets which may become lodged in passages 45 and engage a surrounding wall surface of the bearing housing 32 such as shown at 91 (see FIG. 5). This self clearance is aided in the biased attachment of the rotor assembly. Another important feature in avoiding tablet hangup in the rotor member 30 is the fact that tablets will only enter the passages 45 when they are positioned below a midline which would constitute the lower 180 degree rotation of the rotor member 30 in the hopper 16 and unlike the device described in the Handeland U.S. Pat. No. 4,235,849 will dispense the tablet at the lower point of disc rotation. Still another advantage of having the motor member 30 positioned at the indicated angle in the hopper 16 is the avoidance of a large weight of tablets on the rotor wall surface 91 and consequently the tendency to be impacted in the passages 45. This obviates the need for baffles such as 84 and 86 as illustrated in the Handeland U.S. Pat. No. 3,785,525. Yet another advantage in providing accurate pellet dispensing as well as the clearing away of any particulate debris from the hopper 16 is the placement of the discharge passage 79 at a midpoint of the loading cycle of the rotor member 30 and at or near the bottom of the hopper 16. This aids in uniform loading and debris elimination. It will be noted that compartment 28 in rotor member 30 is of an inverted trapezoidal shape. As tablets enter this area, the flat walls of the compartment will act as a low torque stirring device for the tablets in the hopper 16 for agitation purposes.

A specific type of carrying passageway for the pellets has been described by the numeral 45 in the rotor member 30 for the passage of tablets therethrough. It will be appreciated that geometric configuration of the passageway is not limited to this particular configuration as indicated by the rotor member 80 illustrated in FIG. 12. As there illustrated, a passage 82 is of a generally U shape configuration with an intermediate baffle portion 86. It will be appreciated that this particular passage imparts a similar change in direction to the tablet as it passes from inside the hopper 16 through the rotor housing 83 and into the exit tube portion 85. Rotor housing 83 is rotatably supported in the annular housing portion 81 by the bearings 84. In the instance of the rotor members 30 and 80, two such passageways are positioned diametrically opposite in their respective rotor bodies. If desired, four such passageways could be advantageously employed with the passageways spaced equidistantly 90 degrees apart in the rotor bodies. It is also envisioned that still an additional number of passageways could be advantageously utilized in conjunction with the rotor body of this invention when disposed at the angular relationship in conjunction with the hopper 16.

The geometric shape of the tablet carrying passages such as 45 and 82 with the intermediate step for the switching feature as provided by floor 46 or baffle 86 is important in that it is more tolerant of broken tablets and accordingly will not result in the jamming of tablets therein. In the unlikely event of such a jamming, and as previously indicated, rotor members 30 and 80 can be easily driven by a small powered motor which is self reversing and will so self reverse when a certain resistance is met. The geometric configurations of the pellet carrying passageways 45 or 82 with the bi-directional feature permits the rotor members to be driven in either a clockwise or counter clockwise motion and accordingly dislodge as well as subsequently load any tablets which are improperly lodged in the rotor housing. While the dimensions of the passages 45 and 80 and the geometric configurations are not critical, it has been found that passageways which are two and one-half times the maximum dimension of the pellet in length and have an arcuate step such as indicated at 73 has been found to work well. Another advantage of the pellet dispenser of this invention is the fact that the pellet discharge means as provided by the rotor members 30 and 80 in conjunction with the drive mechanisms and their housings for fitting into the angled wall portion 17a are not necessarily limited to a nut and bolt fastening such as described by the bolts 50 and nuts 51 in conjunction with the base plate 48. Instead, connection could be made as a screw-on unit such as by utilizing a threaded flange section 27 for threadable engagement with a wall section extending from hopper wall portion 17a. Alternatively, rather than a screw fitment between the discharge rotor member into the hopper, an annular inter-fitting projection and groove flange arrangement could be employed.

It will be appreciated that the time the rotor member 30 is operating to dispense tablets into the well is directly controlled by the cam plates 56 and 57 and the contact of their camming surfaces 93 and 94 with the switch arm 88. The switch arm 88 is of sufficient width to contact both the camming surfaces 93 and 94 together or separately as they are rotated by the timing motor 53. The adjustment to have camming surfaces 93 or 94 coincidental or camming surface 94 extend beyond surface 93 is effected by lifting the knob 71 which will also lift the cam plate 57 away from the cam plate 56 and against the force of the spring 57. Positive contact will be effected between the cam plate 56 which is driven by the rotor shaft 55 and the cam plate 57 by the positive engagement of the projection 63 when it is selectively positioned in one of the notches 62 in the cam plate 56. Suitable markings such as 92 can be applied to the dial plate 60 to indicate the desired timing that the meter motor 41 is to operate. It should be appreciated that when switch arm 88 is not in contact with either cam surface 93 or 94 such as when it drops over drop surface 89, electric current to the meter motor 41 will be stopped. In any event, the operation of the timer motor 53 and timing cam plates 56 and 57 is such that the time switch 88 is depressed and meter motor 41 operates is an additive function with respect to the pump motor 72.

Not only is the tablet dispenser of this invention capable of utilizing rotor members with various numbers of tablet carrying passageways, it is not limited to the specific timer mechanism such as indicated by timer motor 53 and the timing mechanism which includes the cam plates 56 and 57. This specific type of timing is best utilized in conjunction with a home operation as illustrated by its usage in a well. The tablet dispenser of this invention is just as easily operable in conjunction with other water treatment systems such as a large or small scale water cooling tower for an air conditioning system. In the latter instance, an electronic type circuit board timer would be substituted for the camming type timing which circuitry would be activated by the start of a pump or fan. While cooling towers and wells are some examples of usage for the tablet dispenser 10, it could also be used in conjunction with other facilities which would require the sequential placement of a pellet or tablet in the system such as in waste water treatment or food processing. In the latter instance, salt tablets would be dispensed.

It will thus be seen that through the present invention there is now provided a pellet dispenser mechanism which can accurately dispense pellets while avoiding the problems of jamming during the dispensing operation. The pellet dispenser of this invention is very versatile in that it can accept pellets of various sizes and do so in conjunction with a rotor mechanism which can have various numbers of pellet carrying passageways therethrough. The unique pellet carrying passages and the disposition of the rotor member avoids the undesired scraping or sliding action of commonly used rotor dispensing plates and base plates. Additionally, the versatility of the present pellet dispenser is seen in that it can be employed with a low torque type motor and with various types of timing mechanisms. Accordingly, the pellet dispenser of this invention can be utilized in conjunction not only with the well of a household but just as easily in connection with the cooling tower of an industrial plant. The pellet dispenser of this invention employs a minimum number of components and accordingly can be economically manufactured and utilized.

The foregoing invention can now be practiced by those skilled in the art. Such skilled persons will know that the invention is not necessarily restricted to the particular embodiments presented herein but the scope of the invention is to be defined by the terms of the following claims as given meaning by the preceding description.

We claim:

1. A dispensing device for pellets comprising:
   a hopper member defining a wall portion with an opening therethrough;
   a pellet discharge means;
   a rotor assembly operatively positioned in connection with said hopper wall opening and said pellet discharge means, said rotor assembly including a rotor member having at least one pellet carrying passage, said pellet carrying passage being in communication with said hopper wall opening and in a selected position being in communication with said pellet discharge means, said pellet carrying passage constructed and arranged to impart at least two different directions to said pellets as they pass through the pellet carrying passage;
   drive means operatively associated with said rotor member to rotate said rotor member;
   wherein said pellet discharge means is positioned adjacent the bottom of said rotor assembly when mounted in said hopper member; and
   wherein said rotor assembly includes a wall surface and said pellet varrying passage includes a floor portion with said floor portion spaced from said wall surface a distance which is greater than half of the minimum dimension of the pellet.

2. A dispensing device for pellets comprising:
   a hopper member defining a wall portion with an opening therethrough;
   a pellet discharge means;
   a rotor assembly operatively positioned in connection with said hopper wall opening and said pellet discharge means, said rotor assembly including a rotor member having at least one pellet carrying passage, said pellet carrying passage being in communication with said hopper wall opening and in a selected position being in communication with said pellet discharge means, said pellet carrying passage constructed and arranged to impart at least two different directions to said pellets as they pass through the pellet carrying passage;
   drive means operatively associated with said rotor member to rotate said rotor member;
   wherein said rotor member defines an open face portion for communication with said hopper wall opening;
   wherein said pellet carrying passage is defined by a plurality of passages; and
   wherein said pellet carrying passage is defined by a channel which is substantially U-shaped in configuration with an intermediate baffle portion.

3. In a dispensing device of the type having a hopper member with a hollow interior for holding pellets, having a pellet discharge means, having a rotor member positioned between the interior of said hopper and said pellet discharge means and having drive means for rotating said rotor member, an improvement in which said rotor member comprises:
   means forming at least one opening into said interior for receiving an individual pellet when said rotor member is in a first position;
   means forming a pellet carrying passage for communication between said opening and said pellet discharge means, wherein said means forming the pellet carrying passage also forms an offset portion in said pellet carrying passage that is offset from said opening in a lateral direction relative to said rotor member; and
   means in the pellet carrying passage for supporting an individual pellet received through said opening in said rotor member until said rotor is rotated from the first position to a second position where said pellet drops into said offset portion on its way to said discharge means.

4. The improvement of claim 3, wherein said offset portion is offset from said opening along a line substantially perpendicular to a radius of said rotor member.

5. The improvement of claim 3, wherein said offset portion is offset from said opening along a radius of said rotor member.

6. The improvement of claim 5, wherein said pellet carrying passage is defined by a channel which is substantially U-shaped in configuration.

7. A dispensing device for pellets comprising:
   a hopper member with a hollow interior for holding pellets;
   a pellet discharge means;
   a rotor assembly operatively positioned between said hollow interior and said pellet discharge means, said rotor assembly including a rotor member having at least one pellet carrying passage, and said rotor assembly also including a wall surface opposing a side of said rotor member that faces away from said hopper member;
   drive means operatively associated with said rotor member to rotate said rotor member;
   wherein said rotor assembly is mounted to said hopper member by biased securing means to allow movement of the rotor assembly; and
   wherein said drive means includes a motor that will rotate the rotor member in one direction, and upon encountering resistance caused by a pellet that may become jammed in relation to said rotor assembly, said motor will automatically rotate the rotor member a distance in a reverse direction, said motor and said biased securing means acting on said rotor assembly to assist in dislodging the jammed pellet.

* * * * *

UNITED STATES PATENT AND TRADEMARK OFFICE
CERTIFICATE OF CORRECTION

PATENT NO. : 4,662,538

DATED : May 5, 1987

INVENTOR(S) : Paul R. Goudy, Jr. et al.

It is certified that error appears in the above-identified patent and that said Letters Patent is hereby corrected as shown below:

Column 9, line 28, "varrying" should read --carrying--

Signed and Sealed this

Third Day of November, 1987

Attest:

DONALD J. QUIGG

*Attesting Officer*  *Commissioner of Patents and Trademarks*